United States Patent
Charters et al.

(10) Patent No.: US 10,313,948 B2
(45) Date of Patent: *Jun. 4, 2019

(54) SELECTION OF INTER-NETWORK COMMUNICATION

(71) Applicant: International Business Machines Corporation, Armonk, NY (US)

(72) Inventors: Graham C. Charters, Southampton (GB); Bret W. Dixon, South Perth (AU); Benjamin T. Horwood, North Perth (AU); Alexander H. Poga, Peppermint Grove (AU); Mark A. Shewell, Perth (AU)

(73) Assignee: International Business Machines Corporation, Armonk, NY (US)

(*) Notice: Subject to any disclaimer, the term of this patent is extended or adjusted under 35 U.S.C. 154(b) by 93 days.

This patent is subject to a terminal disclaimer.

(21) Appl. No.: 15/204,150

(22) Filed: Jul. 7, 2016

(65) Prior Publication Data

US 2017/0289765 A1 Oct. 5, 2017

Related U.S. Application Data

(63) Continuation of application No. 15/086,133, filed on Mar. 31, 2016.

(51) Int. Cl.
H04W 36/24 (2009.01)
H04W 36/14 (2009.01)
H04W 36/32 (2009.01)
H04W 4/029 (2018.01)
(Continued)

(52) U.S. Cl.
CPC ...... *H04W 36/245* (2013.01); *G06Q 30/0261* (2013.01); *G06Q 30/0267* (2013.01); *H04W 4/029* (2018.02); *H04W 36/14* (2013.01); *H04W 36/32* (2013.01); *H04W 84/18* (2013.01)

(58) Field of Classification Search
None
See application file for complete search history.

(56) References Cited

U.S. PATENT DOCUMENTS 8,498,817 B1 7/2013 Erdmann et al.
8,958,743 B2 2/2015 Nakfour et al.
(Continued)

FOREIGN PATENT DOCUMENTS

WO 2010028315 A1 3/2010
WO 2015064952 A1 5/2015
WO 2016062413 A1 4/2016

OTHER PUBLICATIONS

Lee et al., "InterMR: Inter-Manet Routing in Heterogeneous MANETs", 2010 IEEE 7th International Conference on Mobile Adhoc and Sensor Systems (MASS), Nov. 8-12, 2010, pp. 372-381 DOI: 10.1109/MASS.2010.5663948.
(Continued)

*Primary Examiner* — Chi H Pham
*Assistant Examiner* — Vladislav Y Agureyev
(74) *Attorney, Agent, or Firm* — Peter J. Edwards

(57) ABSTRACT

A device to deliver data to a network may be identified. The data to be delivered may be identified. Information associated with a device's probability of travelling to the network may be identified. Based on that information, the data to be delivered may be transferred to the device.

11 Claims, 5 Drawing Sheets

(51) Int. Cl.
*G06Q 30/02* (2012.01)
*H04W 84/18* (2009.01)

(56) References Cited

U.S. PATENT DOCUMENTS

| | | | | |
|---|---|---|---|---|
| 9,008,696 | B1* | 4/2015 | Beattie | H04W 28/0226 455/456.3 |
| 2006/0166699 | A1* | 7/2006 | Aghvami | H04L 47/14 455/552.1 |
| 2006/0227744 | A1* | 10/2006 | Metke | H04W 36/32 370/331 |
| 2007/0104166 | A1* | 5/2007 | Rahman | H04W 36/32 370/338 |
| 2007/0156804 | A1* | 7/2007 | Mo | H04W 8/02 709/200 |
| 2007/0254626 | A1* | 11/2007 | Ahlgren | G01S 5/0018 455/404.2 |
| 2008/0117875 | A1* | 5/2008 | Bennett | H04W 36/32 370/331 |
| 2009/0116445 | A1* | 5/2009 | Samar | H04W 36/02 370/331 |
| 2010/0150107 | A1* | 6/2010 | Aghvami | H04W 36/0016 370/331 |
| 2012/0202551 | A1 | 8/2012 | Mirbaha et al. | |
| 2014/0355565 | A1* | 12/2014 | Hayes | H04W 36/245 370/331 |
| 2015/0038143 | A1* | 2/2015 | Kilpatrick, II | H04W 64/00 455/436 |
| 2015/0087313 | A1* | 3/2015 | Kim | H04W 8/02 455/437 |
| 2015/0112808 | A1* | 4/2015 | Coatney | G06Q 30/0261 705/14.58 |
| 2015/0181481 | A1* | 6/2015 | Masini | H04W 36/32 455/436 |
| 2015/0373086 | A1* | 12/2015 | Hunt | H04L 67/10 709/201 |
| 2016/0112942 | A1* | 4/2016 | Chang | H04W 48/20 455/434 |

OTHER PUBLICATIONS

Lim et al., "MANET ID : Improvement on Group Communications and ZRP", Second International Conference on Systems and Networks Communications (ICSNC 2007), Aug. 25-31, 2007, 7 pages DOI: 10.1109/ICSNC.2007.50.
Charters et al., "Content Hosting in a Mobile Ad Hoc Network", U.S. Appl. No. 15/077,223, filed Mar. 22, 2016.
Charters et al., "Dynamic Generation of Geographically Bound MANET IDS", U.S. Appl. No. 15/005,482, filed Jan. 25, 2016.
Charters et al., "Content Sharing in Mobile Ad Hoc Networks", U.S. Appl. No. 14/950,236, filed Nov. 24, 2015.
Charters et al., "Selection of Inter-Network Communication", U.S. Appl. No. 15/086,133, filed Mar. 31, 2016.
IBM, List of IBM Patents or Patent Applications Treated as Related, Jul. 6, 2016, 2 pages.
Charters et al., "Content Hosting in a Mobile Ad Hoc Network", U.S. Appl. No. 15/164,265, filed May 25, 2016.
Charters et al., "Dynamic Generation of Geographically Bound MANET IDS", U.S. Appl. No. 15/183,825, filed Jun. 16, 2016.

* cited by examiner

SELECTION OF INTER-NETWORK COMMUNICATION

BACKGROUND

Aspects of the present disclosure relate to networks, more particular aspects relate to communications between mobile ad hoc networks.

Typical methods of communication between networks rely on transmitting data over the internet to a network or device address. These methods are sometimes ineffective in communications between networks without a reliable internet connection. These networks are typically geographically stable, though the list of devices in the network typically changes regularly.

SUMMARY

Some embodiments of the present disclosure can be illustrated by a method of identifying a device to deliver data to a network. In the method, a processor may identify content to be communicated to a first network. The processor may then identify information associated with a probability that a first device of a second network will travel to the first network. Based on that information, the processor may transfer the content to the first device.

Some embodiments of the present disclosure can also be illustrated by a computer program product, the computer program product comprising a computer readable storage medium having program instructions embodied therewith. When executed, the program instructions may cause the computer to identify content to be communicated to a first network. The computer may then identify information associated with a probability that a first device of a second network will travel to the first network. Based on the probability that the device will travel to the first network, the computer may transfer the content to the first device.

Some embodiments of the present disclosure can also be illustrated by a system configured to perform a method for inter-network communications. The system may contain a processor configured to broadcast, to devices of a first network over the first network, a request for information associated with histories of travel of the devices to a second network. The processor may receive replies over the first network from a set of the devices, each reply including information associated with the replying devices' history of travel to the second network. The processor may further be configured to identify, based on the replies, a first subset of devices within the set of devices that have travelled to the second network. The processor may further be configured to identify, based on the replying devices' history of travel, a second subset of devices within the first subset of devices that have a sufficient probability of travelling to the second network within a target time period. The processor may further be configured send, to the second subset of devices, data addressed to the second network.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Figure 1:
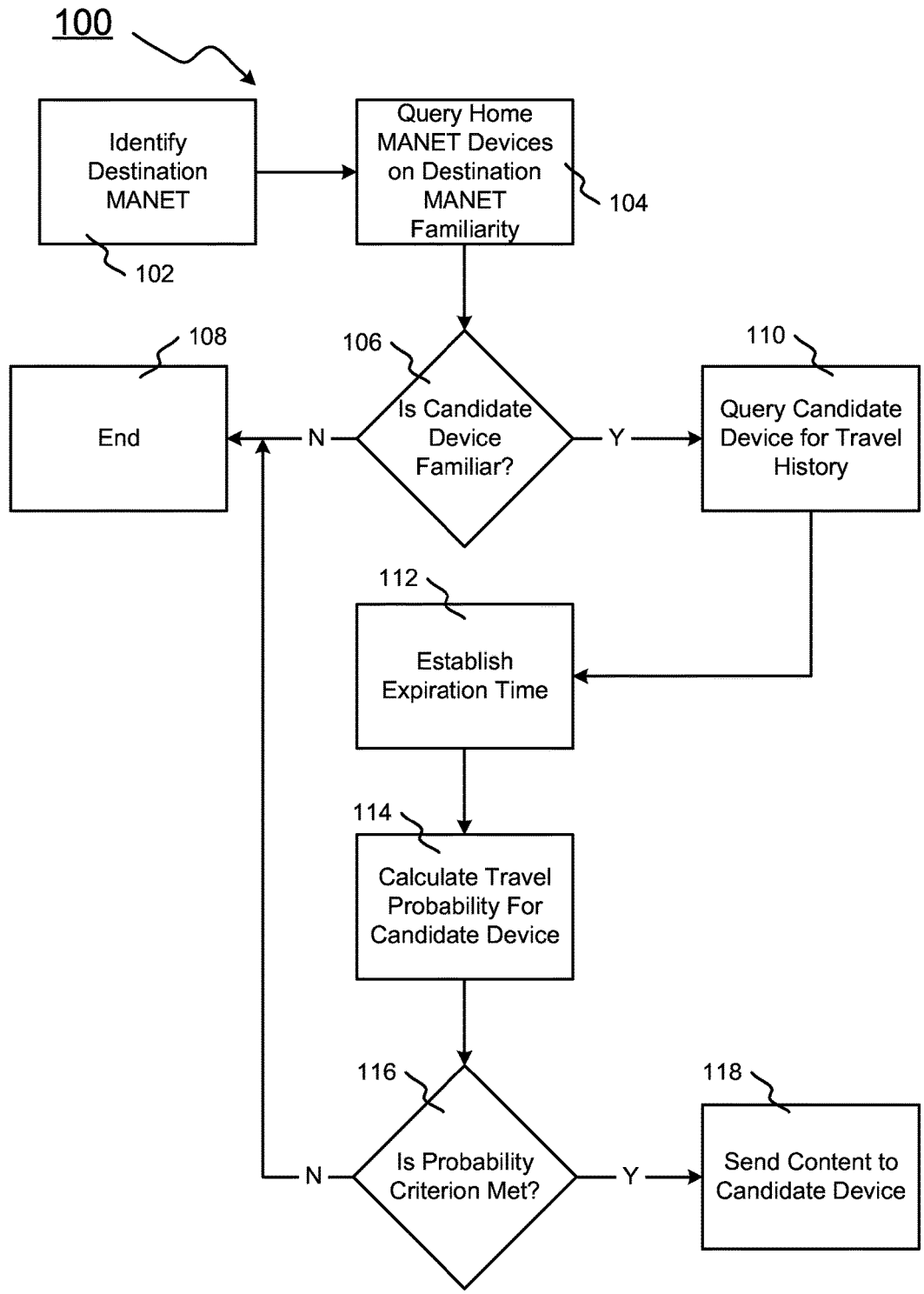
FIG. 1 depicts a method by which a courier device may be selected for transferring content to a destination MANET, in accordance with embodiments.

Aspects of the present disclosure relate to networks, more particular aspects relate to communications between mobile ad hoc networks. While the present disclosure is not necessarily limited to such applications, various aspects of the disclosure may be appreciated through a discussion of various examples using this context. For example, aspects of the present disclosure may be applied to non-Internet communications between multiple networks of various organizations, such as multiple wireless local area networks of geographically separated office buildings. However, in the interest of facilitating understanding, the aspects of the present disclosure will be described in relation to mobile ad hoc networks.

Mobile ad hoc networks (MANETs) are typically wireless networks composed of a number of mobile devices, such as smart phones, tablets, laptops, and commercial equipment configured to communicate with other commercial equipment within short distances. These mobile devices may connect to and disconnect from a MANET as they move in and out of range, and thus the devices that make up a MANET may change frequently. This may cause the size of the MANET, both in terms of population (e.g., number of devices in the MANET) and geographic boundary (e.g., the boundary of the wireless signal of the peripheral devices of the MANET as expressed in terms of geographic coordinates) to fluctuate. However, many MANETs may be centered around a geographically stable area (e.g., the center of a large city or a military base), and therefore the general boundaries of these MANETs, while shifting slightly, may also remain geographically stable.

As the mobile devices that compose MANETs become more prevalent, MANETs themselves not only become larger, but more numerous. Further, because MANETs are becoming more prevalent, many MANETs are growing in size, and because the mobile devices that compose MANETs are becoming more numerous, travel of mobile devices from one MANET to another (e.g., from the city in which a mobile-device user works to the city in which a mobile-device user lives) may be growing more frequent as well.

These developments are making inter-MANET communication more feasible. However, due to the ad hoc nature of MANETs, MANETs may not have a centralized address (e.g., an IP address) to which data (also referred to herein as "information," "content," "communication," "message," "data message," "information" and others) in inter-MANET communication may be addressed. Rather, some MANETs may be solely composed of mobile devices that each has its own address. The particular mobile devices that make up a MANET at any given time may not be ascertainable, and thus utilizing the addresses of mobile devices to transfer data to a MANET may often be an unreliable method of inter-MANET communication. Further, because a MANET is typically defined by the connections between the mobile devices that make up the MANET, MANETs often do not depend on, and may not have access to, any connection to an outside network (e.g., an Internet connection). Rather, a MANET may be fully functional while being completely isolated from an outside network. Thus, a method of inter-MANET communication that relies upon outside-network connections in order to deliver data to a MANET may also be unreliable.

Some embodiments of the present disclosure may take advantage of the physical travel of a particular mobile device from a source MANET to a destination MANET to transfer data between those two MANETs. In some embodiments, information associated with a device's probability to travel to a destination MANET may be used to select a device to be used to transfer the data. This information may be data that has implications on the device's probability of travelling to the destination MANET (e.g., the device's history of travel to the destination MANET), a calculated probability that the device will travel to the destination MANET, a relative probability that the device may be sufficiently likely to travel to the destination MANET, a relative probability that the device may be more likely to travel to the destination MANET than other devices, or other similar information.

For example, in some embodiments, the travel history of that particular mobile device (referred to herein as a "courier device") to the destination MANET may be used to determine the probability that the mobile device will travel to the destination MANET again in time for the data to be delivered. The travel history may be determined, for example, by examining a list of prior connections that the courier device has made with other devices of the destination MANET (e.g., wireless connections to mobile devices in the destination MANET) with timestamps associated with each connection. If it is determined that the courier device has a high probability of travelling to the destination MANET in time to deliver the data (e.g., before an advertisement communicated by the data expires), the data may be transferred to that courier device with a request to spread it throughout the destination MANET upon arrival.

FIG. 1 illustrates a potential method 100 by which a device (also referred to herein as a "courier device") may be selected for transferring content to a destination MANET by a device or user that desires the content to be sent (referred to herein as a "promoter device" or "user"). A destination MANET (or list of destination MANETs) is identified in block 102. In some embodiments the method chosen to identify the destination MANET may depend on the purpose of the communication to the destination MANET. For example, the content may be a patent-attorney job-opportunity posting. In that case, potential destination MANETs may be MANETs with a geographic area that also contains office buildings rented out to law or engineering firms. In some cases the content may actually be meant for a particular user or a small group of users, in which case the destination MANETs may be composed of the list of MANETs that the user or users are known to frequent (e.g., the MANET sharing a geographic area in which a particular user lives or works). The content may also be an advertisement for a new household product, in which case the MANET may be chosen based on a preference for MANETs with a high number of mobile-device members, in order to spread the advertisement to as many users as possible. In related instances the properties of the destination MANET may not be important, as the individual sending the content may wish to send the content to any MANET to which a courier device is likely to travel soon. In these instances, the MANETs may be chosen based on whether any courier device is calculated as having a high probability of travelling to the MANET in later operations of method 100.

Once the MANET is chosen in block 102 (or, in some instances, after the decision is made to send to all MANETs that are likely to be visited within a set time period), a query is sent in block 104 throughout the MANET in which the promoter device is located (referred to herein as the home MANET). In some embodiments this query may ask recipients of the query to send information regarding the recipient's familiarity with the destination MANET (e.g., whether the recipient has ever travelled to the destination MANET) to the promoter device. In these embodiments, the query may be sent to all devices of the home MANET. In other embodiments, some MANET devices may store information on their own familiarity and the familiarity of other potential courier devices. For example, in some home MANETs one or several home-MANET devices (referred to herein as coordinating devices) may collect, from every other home-MANET device, a list of other MANETs to which that home-MANET device has travelled. The coordinating devices may then store the collected familiarity information for each home-MANET device. In these embodiments the query may be sent by the promoter device to only the coordinating devices.

In some further embodiments the promoter device may not send the query to all home-MANET devices due to other restrictions, such as lack of resources, MANET limitations on solicitation, a small amount of time in which to disseminate the query, or others. In these embodiments, the recipients of the query may be selected randomly, or by topological proximity to the promoter device. As an example of topological proximity, a topological-distance limit of 3 may be chosen. In that case, the promoter device may send to all devices within range of the promoter device (topological distance of 1). Those devices would in turn send the query to all devices within their range (topological distance of 2 from the promoter device). Those further devices may in turn send the query to all devices within their range (topological distance of 3 from the promoter device), at which point the dissemination of the message would be terminated. In some other embodiments a promoter device may have a list of particular home-MANET devices to which the query is to be sent. For example, if a MANET consists of several thousand remote devices, but the promoter device is aware from past experience that forty particular devices travel to other MANETs frequently, the promoter device may only send the query to those forty devices.

Once the query is sent in block 104, the promoter device may receive one or more replies to the query. A given query reply may contain the familiarity information of the responder, of a plurality of home-MANET devices, or of every home-MANET device. The promoter device may then group the replies and select a home-MANET device for which the promoter has received familiarity information. This selected home-MANET device (referred to herein as a "Candidate Device") may then be analyzed as a potential candidate to act as a courier device. In block 106, the promoter determines whether the selected candidate device is familiar with the destination MANET. If the candidate device is not familiar with the destination MANET (e.g., it has never travelled to the destination MANET), the promoter device concludes the method for that candidate device in block 108. If, however, the candidate device is familiar with the destination MANET, the promoter device sends a query to the candidate device for the candidate device's travel history in block 110. In some embodiments this may involve sending a second query directly to the candidate device of whom travel history is sought. In other embodiments this may involve sending a query to one or more coordinating devices that may collect the travel history of the candidate device and other home-MANET devices.

In FIG. 1, the promoter device establishes an expiration time in block 112 following sending the second query in block 110. This expiration time may be the time before which the user of the promoter device would like the content to be delivered to the destination MANET, and may be a time limit (e.g., a number of minutes after the establishment of the expiration time), or a specific time (e.g., a time on a particular calendar day). If the content is an invitation to an event, for example, the expiration time may be the calendar date of the event. If the content is a warning of a weather event in the geographic area of the destination MANET, the expiration time may be the number of hours between when the expiration time is calculated and when the weather event is estimated to end. In some embodiments the content to be delivered to the destination MANET may not be time sensitive, and thus in those embodiments a non-limiting expiration (e.g., 1,000 years) time may be established. In those embodiments, the promoter device may proceed from block 110 to block 114. In other embodiments, the expiration time may be established earlier or later in the method. For example, the expiration time may be established before the destination MANET is identified, or after the travel probability is established.

After block 110, the promoter device may receive a reply from the recipient of the second query with the travel history of the candidate device. In block 114, the promoter device may calculate the probability that the candidate device may travel to the destination MANET. In some other embodiments, the candidate device may be configured to perform this calculation for the promoter device. Such an embodiment is illustrated as a portion of FIG. 2.

The nature of the calculation in block 114 may vary based on configurations of the promoter device (e.g., the calculation capabilities of the promoter device and whether the promoter device has established a limiting expiration time) and the travel history of the particular device. For example, the calculation may determine the number of days (e.g., calendar days) during which the candidate device has travelled to the destination MANET, and divide that by the total number of days that have elapsed since the candidate device first travelled to the destination MANET. The resulting decimal may be used as a rough probability that the candidate device will travel to the destination MANET on each day following the current day. If the promoter device has established an expiration time of a number of days, this per-day probability may be used to determine the probability that the particular device will travel to the destination MANET before the expiration time. For example, if the promoter device determines that the candidate device has a 25% chance of visiting the destination MANET per day, and the expiration time is three days, the promoter device would determine that the particular device has approximately a 57.8% chance of visiting the destination MANET before the expiration time.

In some embodiments more complicated probability calculations may be utilized. For example, the promoter device may be configured to recognize patterns in the candidate device's travel history. For example, the candidate device may have travelled to the destination MANET on most weekdays in the past 3 months. This may be likely if the candidate device is owned by a user who started a job three months ago in an office building that shares a geographic area with the destination MANET. If the promoter device establishes an expiration time of the next three weekdays, the promoter device may determine a high (e.g., 99%) probability that the candidate device will travel to the destination MANET before the expiration time. However, if the user of the candidate device periodically travels elsewhere for work every fourth Monday, Tuesday and Wednesday (e.g., to a company site in another state), the promoter device may recognize a pattern that the candidate device does not travel to the destination MANET on those days. If the candidate device's history of travel shows that the candidate device has travelled to the destination MANET the last three Mondays, Tuesdays, and Wednesdays, the promoter device may calculate that the candidate device has a very low probability (e.g., 5%) of travelling to the destination MANET on the upcoming Monday, Tuesday, and Wednesday. If the expiration time were to start on Monday at midnight and continue through the following forty-eight hours, the promoter device would calculate a 5% probability that the candidate device would travel to the destination MANET before the expiration time.

In some embodiments calculating a probability may not involve calculating a numerical probability. In these embodiments, calculating a probability may involve identifying a relative probability, or even identifying information that may have implications of a device's probability. For example, a promoter device may calculate the probability that a first candidate device will travel to a destination MANET relative to the probability that a second candidate device will. The promoter device may calculate this relative probability by querying both devices for their travel history and determining which device of the two devices has travelled to the destination MANET more than the other (e.g., by adding the total number of days or number of days in a time period in which the first device has travelled to the destination MANET and comparing it to a corresponding number for the second device). The promoter device may determine that the device with more travel to the destination MANET has a higher relative probability of travelling there in the future.

In further embodiments, different probability calculations based on the travel history are possible. Some may be based on patterns in calendar days (e.g., the candidate device's user may visit a friend in the destination MANET's geographic area approximately once every three months), whereas others may be based on time of day (e.g., the candidate device may have a history of travel to the destination MANET at 3 PM every day). Further, in some embodiments a non-limiting expiration time (e.g., by 3,000 AD) may be chosen initially and replaced with a limiting expiration time later in the analysis. In some embodiments, the limiting expiration time may not be established until after an initial probability is calculated. In those embodiments, the promoter device may adjust the initial probability of travel to reflect the requirement that the travel is to occur before the limiting expiration time. Some further embodiments may have multiple limiting expiration times that are utilized to identify a candidate device in a set of candidate devices that is most likely to travel to a destination MANET earlier than the other candidate devices. Such an embodiment is discussed in more detail below.

Once the probability of travel for the candidate device is calculated, the promoter device determines whether that probability is meets a probability criterion in block 116. The probability criterion may vary based on the embodiment. In some embodiments, the probability criterion may be a probability threshold. For example, in some embodiments the promoter device may be configured to send the content to all candidate devices that have a probability above 70%. In other embodiments, the probability criterion may be a required rank of the candidate device's probability of travel. For example, the promoter device may be configured to send content only to the two candidate devices with the highest probability of travelling to the destination MANET before the execution time. In this example, the probability criterion may be whether the probability is one of the two highest probabilities.

If the promoter device determines that the candidate device's probability does not meet the probability criterion, the promoter device concludes the method for that candidate device in block 108. If, however, the candidate device's probability does meet the probability criterion, the promoter device sends the content to that candidate device in block 118. The content may be accompanied by a request to distribute it to the destination MANET upon arrival. In embodiments in which an expiration time has been established, this request may also inform the courier device of the expiration time. The promoter device may also request that the courier device delete the content when the expiration time is reached. In other embodiments, the courier device may simply be informed of the expiration time. The courier device, or a user of the courier device, may then have the option to delete the content when the expiration time is reached.

In some embodiments, blocks 106 through 110 and 114 through 118 may be repeated for each candidate device that replied to the query in block 104. However, in some embodiments, the promoter device may be restricted from sending the content to a number of candidate devices over a cap. This cap may be set by the user of the promoter device, or by an agreement of the users of the home MANET. In these instances, the promoter device may prefer candidate devices that have the highest probability, as discussed in connection with block 116. In other embodiments, the promoter device may prefer candidate devices that have a probability of travelling to the destination MANET sooner. For example, the user of the promoter device may set a cap of 1 candidate device, yet two particular devices, device A and device B, may have a probability of travelling to the destination MANET before the expiration time of three days above a probability threshold of 50%. Device A may have a 33% probability of travelling to the destination MANET in the first two of the three days, but a 0% probability of travelling to the destination MANET in the third day. Device B may have a 25% probability of travelling to the destination MANET in all three days. Thus, while device A would have approximately a 56.4% probability of travelling before the expiration time, it would have approximately a 56.4% probability of travelling within two days. Device B, on the other hand, would have approximately a 57.8% chance of travelling to the destination MANET before the expiration time, but would only have approximately a 43.7% chance of travelling within two days. In this example, the promoter device may be configured to send content to device A, rather than device B, due to device A's higher probability of travelling to the destination MANET sooner.

In some embodiments, a promoter device may be configured to select one or more destination MANETs based on the number of home-MANET devices that are familiar with the one or more destination MANETs. This may be beneficial, for example, in instances in which the particular MANETs to which a message is sent may not be important, but the user of the promoter device desires to filter for MANETs to which a high number of devices are likely to travel regularly. By selecting for devices with which many home-MANET devices are familiar, the promoter device may increase the odds of only sending travel-history or travel-probability queries for high-probability MANETs. Further, MANETs with which many home-MANET devices are familiar may be more likely to be a larger MANET. Selecting for larger MANETs may be beneficial, for example, when a promoter-device user does not intend to send a message to any particular destination-MANET user, but desires to send a message to as many destination-MANET users as possible in an efficient manner.

Figure 2:
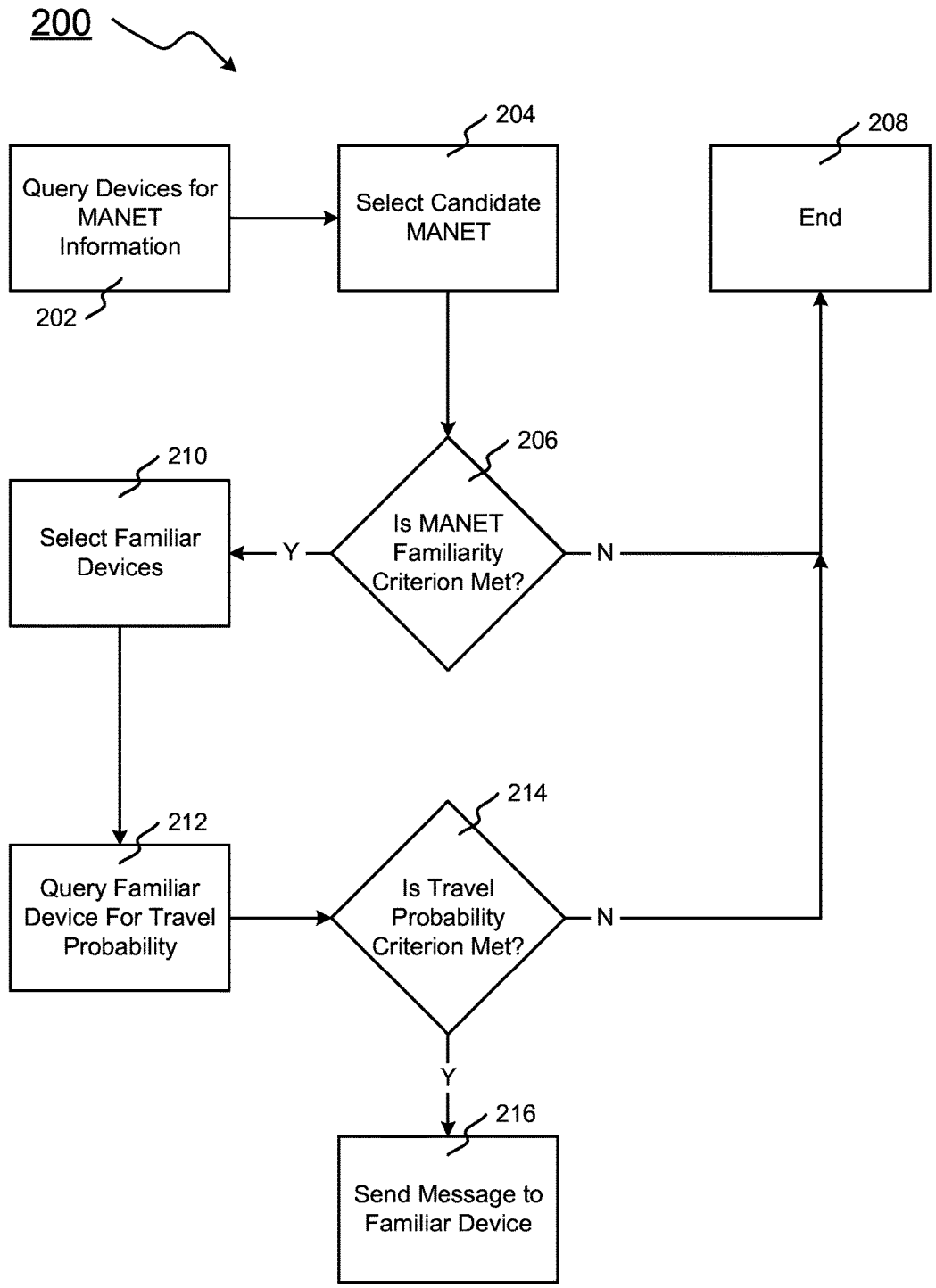
FIG. 2 depicts a method by which a destination MANET may be selected for inter-MANET communication, in accordance with embodiments.

FIG. 2 illustrates a method 200 of identifying MANETs with which a high number of home-MANET devices may be familiar. In block 202, a promoter device queries other devices in its home MANET (home-MANET devices) for information on other MANETs that those home-MANET devices have visited. In some embodiments this query may be sent as part of a broadcast to all home-MANET devices. In other embodiments the query may only be sent to certain home-MANET devices (e.g., one or more coordinating devices). In this embodiment the information requested in the query is a list of MANETs to which each home-MANET device has travelled (i.e., the list of familiar MANETs for each home-MANET device).

Upon receiving replies regarding one or more MANETs, the promoter device may select one of those MANETs (referred to herein as a "candidate MANET") in block 204 to analyze as a candidate for a destination MANET. In block 206, the promoter device determines whether the MANET familiarity criterion is met for that candidate MANET. In some embodiments, this familiarity criterion may be a threshold minimum number of home-MANET devices that have travelled to the candidate MANET. For example, if the threshold were 200 devices, and 400 devices have travelled to the candidate MANET, the MANET familiarity level would be above the threshold. In some embodiments this threshold may be as small as a single device. In other embodiments this familiarity criterion may vary based on requirements placed on the promoter device by the user of the promoter device or an agreement with the devices of the home MANET. In some embodiments, for example, the familiarity criterion may be a required rank of the candidate MANET's familiarity level. For example, there may be a limit in the home MANET on the number of destination MANETs to which a promoter device may coordinate communications in a given time period (e.g., 20 MANETs in a month). Such an agreement may encourage a promoter-device user to limit the amount of MANETs chosen for communication. If, for example, the promoter-device user chose to limit the number of destination MANETs to three MANETs, the familiarity criterion may be whether the candidate MANET's familiarity level is one of the three highest familiarity levels. In this example, only the three most familiar candidate MANETs (i.e., the candidate MANETs with the three highest familiarity levels) would meet the familiarity criterion.

If the candidate MANET selected in block 204 is determined in block 206 to have a familiarity level below the threshold, the promoter device would end the method for that candidate MANET in block 208. If, however, in this embodiment, the candidate MANET's familiarity level is above the threshold, the promoter device would choose that candidate MANET as a destination MANET, and proceed to choose one or more courier devices to carry a message to that destination MANET. The promoter device may have, as part of the replies to the query sent in block 202, a list of home-MANET devices that have travelled to the destination MANET (i.e., familiar devices).

In block 210, the promoter device selects one of those familiar devices for analysis. In this embodiment, the promoter device then sends a second query to that familiar device in block 212, requesting that familiar device's probability of travel to the destination MANET. In some related embodiments, the promoter device may not query the familiar device, but a coordinating device that has collected probabilities of travel for each home-MANET device. In other related embodiments, the promoter device may not request a probability of travel, but a history of travel to the destination MANET, from which the promoter device may calculate the probability of travel. Finally, in this and other embodiments, the travel probability may be based on an expiration time.

The promoter device then determines in block 214 whether the probability of travel to the destination MANET for that familiar device meets a probability criterion. This probability threshold may be determined by methods similar to those discussed in relation to FIG. 1. If the promoter device determines that the familiar device's probability does not meet a probability criterion, the promoter device ends the method for that familiar device in block 208. If, however, the familiar device's travel probability does meet the probability criterion, the promoter device chooses that familiar device as a courier device to the destination MANET, and sends a message to that courier device to be delivered to the destination MANET. The message may be accompanied by a request to distribute it to the destination MANET upon arrival.

In some embodiments, blocks 204 and 206 may be repeated for each MANET for which information was returned in response to the query from block 202. Similarly, blocks 210, 212, and 214 may be repeated for every familiar device, and block 216 may be repeated for every familiar device that is chosen as a courier device.

In some embodiments, the message may include a request for the recipient of communication (i.e., a device in the destination MANET) to send a response communication to the promoter device. For example, the recipient of the communication (referred to herein as a "recipient device") may, upon receiving the message, act as a second promoter device. The second promoter device may employ any method discussed herein to choose a courier device in the second promoter device's home MANET to bring the response communication to the first promoter device. In other embodiments, the first promoter device may request that the first courier device, in addition to carrying the communication to the destination MANET, also carry a response (or multiple responses) back from the recipient device (or the recipient devices).

Figure 3:
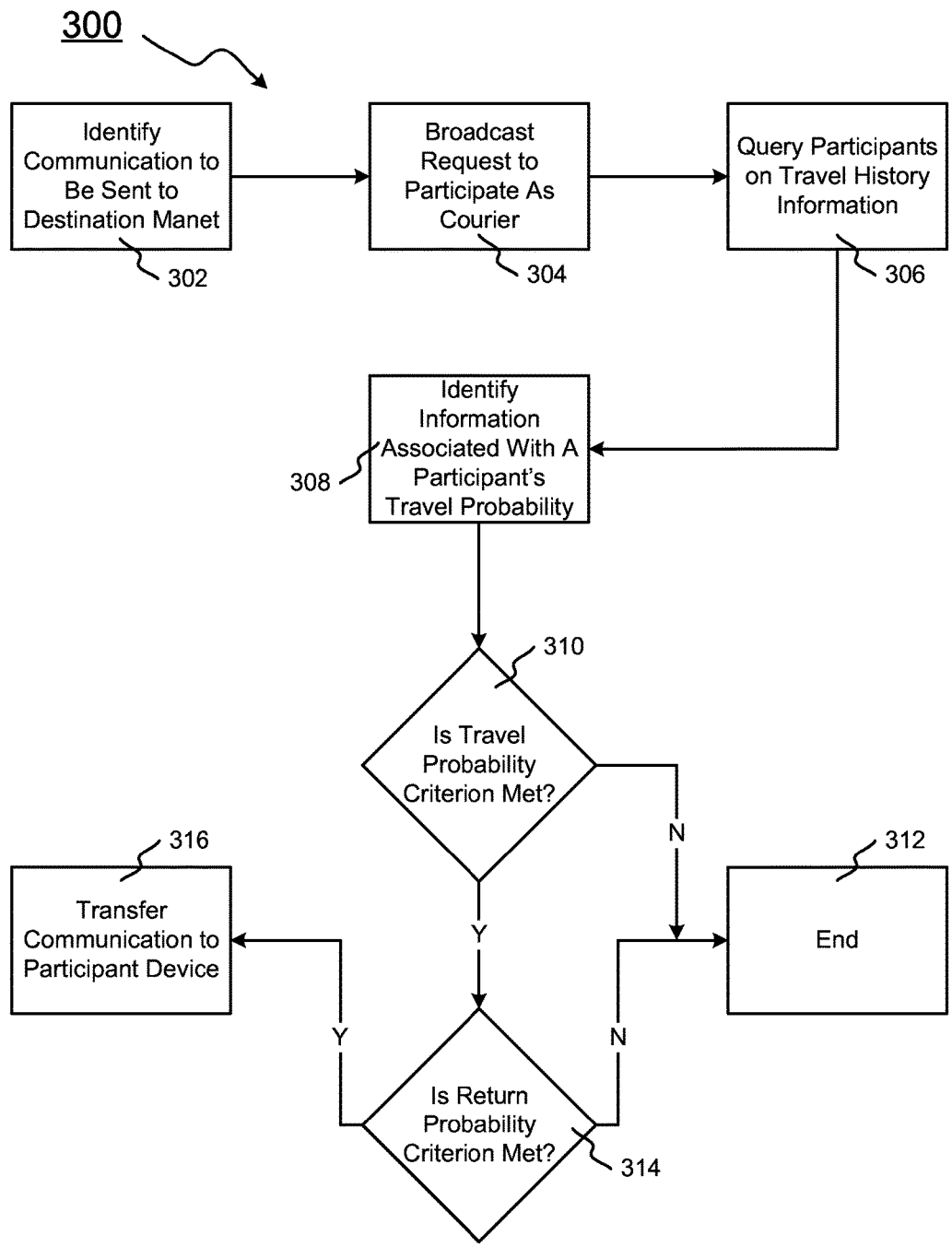
FIG. 3 depicts a method by which a courier device may be selected for transferring a communication to a destination MANET and transferring replies to the communication to the home MANET, in accordance with embodiments.

Such an embodiment is illustrated in FIG. 3 by method 300. In this embodiment method 300 begins in block 302 when a promoter device identifies a communication to be sent to a destination MANET. In some embodiments, this block may occur elsewhere in the method, including immediately before the communication is transferred to a courier device. In block 304, the promoter device may broadcast a request in the promoter device's home MANET for courier devices. In some embodiments (such as in methods 100 and 200), this operation may be omitted. However, this operation may be required in some embodiments, if, for example, an agreement exists among home-MANET devices that only those home-MANET devices that opt in to a courier event may be solicited for that event.

In response to the broadcast in block 304, the promoter device may receive (from coordinating devices or individual home-MANET devices) replies signifying a willingness to act as a courier. The promoter device then sends a query, in block 306, for information associated with a history of travel for each of those willing devices (referred to herein as participant devices). The promoter device receives at least one reply from the participant devices, and, in block 308, identifies information associated with a participant device's travel probability based on the at least one reply. In some embodiments this information may be, for example, a history of travel to the destination MANET and to the home MANET. In other embodiments, it may be, for example, a calculated probability that the participant device will travel to the destination MANET before a first expiration time, and return to the home MANET before the first or a second expiration time. This query may be sent to one or more coordinating device or to the individual participant devices.

In some embodiments the information associated with a participant's travel probability may include information associated with the personal travel plans of a user that operates the particular device. For example, a promoter device may be given access to, in response to a query in block 306, a personal calendar, list of meetings, or airline itinerary belonging to the user of a particular device. With this information, the promoter device may more accurately predict the travel probability of the participant device. For example, if a participant device travels to a destination MANET every weekday, but the particular device's user enters "day off" in his or her personal calendar for a particular weekday, the promoter device may reduce the travel probability to the destination MANET for that weekday. Similarly, if the participant device sends an airline itinerary to a different geographic area for the particular weekday, the promoter device may also reduce the travel probability.

In block 310, the promoter may determine whether a selected participant device has a travel probability that meets a travel-probability criterion. In some embodiments this travel probability may be calculated by the promoter device, whereas in other embodiments it may be received by the promoter device in response to the query sent in block 306. In some embodiments this travel probability may measure the likelihood of travelling to the destination MANET before a first expiration time is reached. The travel-probability criterion utilized in block 310 may be determined by any method discussed in connection with the present disclosure.

If the promoter device determines that the travel probability for the participant device does not meet the travel-probability criterion, the promoter device would conclude the method for that participant device in block 312. If, however, the promoter device determines that the travel probability does meet the travel-probability criterion, it would then proceed to block 314. In block 314, the promoter device determines whether the participant device's probability of return to the home MANET meets a return-probability criterion. This probability, like the travel probability, may be calculated by the participant device, a coordinating device, or the promoter device. Further, this probability may measure the probability of returning before the first expiration time, or a second expiration time. A second expiration time may be beneficial, for example, when a user of the promoter device is required to inform the recipients of a message by a first deadline (e.g., a notification announcing a comment period for a proposed legislative change), and the recipients are required to respond by a second deadline (e.g., the response deadline for the comment period). The return-probability criterion utilized in block 314 may be determined by any method discussed in connection with the present disclosure.

If the promoter device determines that the return probability does not meet the return-probability criterion, the promoter device would end the method for that participant device in block 312. However, if the promoter device determines that the return probability does meet the return-probability criterion, the promoter device would select the participant device as a courier device, and transfer the communication to the participant device in block 316.

In some embodiments of method 300, the promoter device may prefer courier devices that have a high probability of remaining in the destination MANET for a high amount of time between receiving the communication from the promoter device in block 316 and the end of a second expiration time. This may be beneficial, for example, to increase the likelihood that the courier would be in the destination MANET to collect replies from participants. This probability may be calculated utilizing the travel history of the participant device to and from the destination MANET, to and from the home MANET, and to and from other MANETs. For example, the probability that a participant device would travel to the destination MANET and to the home MANET may be relatively high as compared to other participant devices. However, the participant device may typically travel to a third MANET shortly after arriving at the destination MANET (if, for example, the destination MANET shares a geographic area with a transit station that the participant device typically travels through). In this case, the participant device may be a good candidate for delivering a communication to the destination MANET, but a poor candidate for a returning a response to the promoter device. The promoter device may, in this example, select a different participant device with a high probability of travelling to the destination MANET, but also that has a low probability of travelling to a third MANET (e.g., the user of the participant device may work near the transit station, and may only travel to work and home during a typical day). The promoter device may also analyze time stamps associated with connections the participant device has made at each MANET, and determine the length of time the participant device typically spends in the destination MANET before returning to the home MANET.

In some embodiments, blocks 308 through 316 may be repeated for each participant device that responds to the query in block 306.

Figure 4:
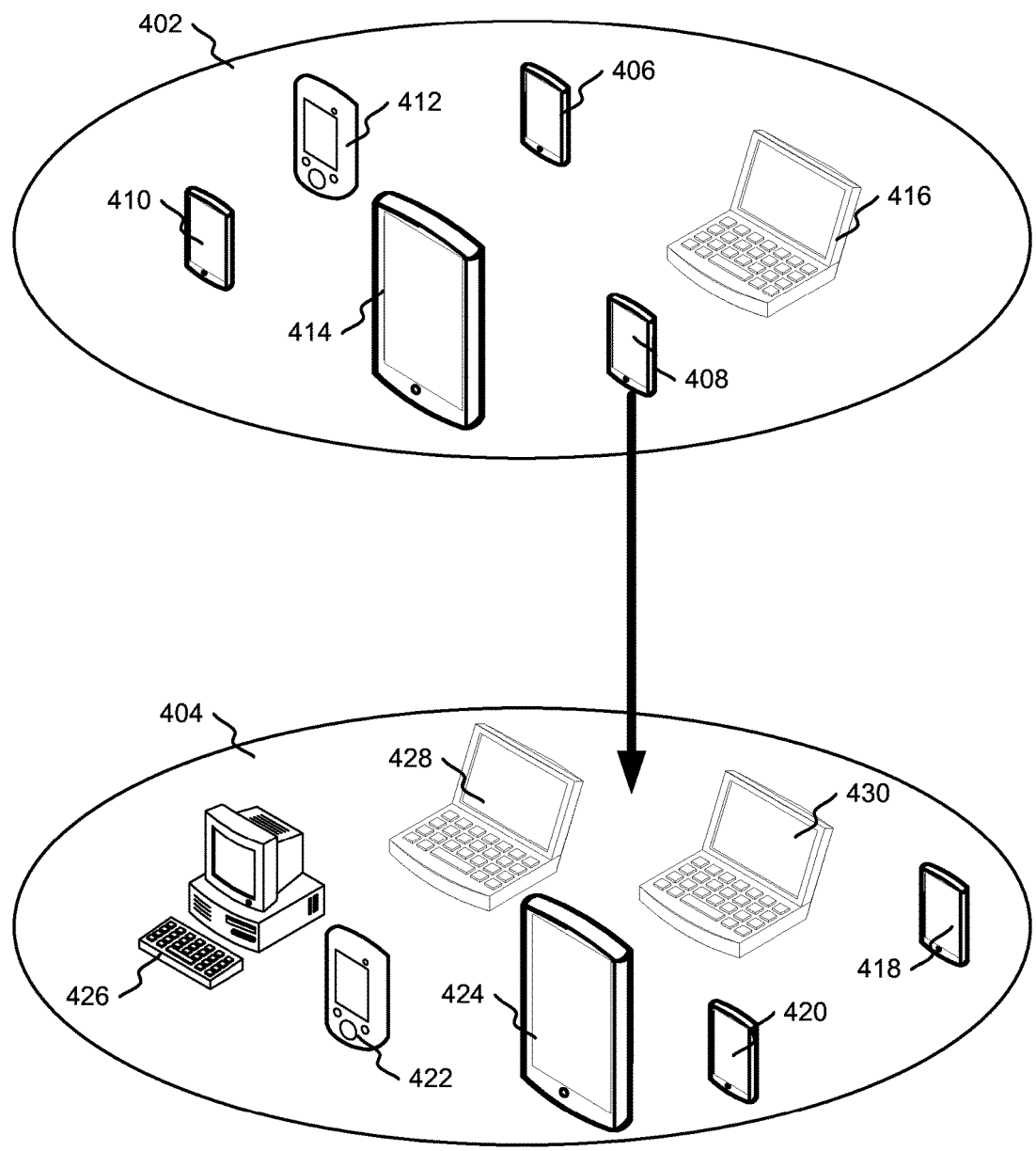
FIG. 4 illustrates a diagram of a home MANET and a destination MANET, in accordance with embodiments.

FIG. 4 illustrates a diagram of a home MANET 402 and a destination MANET 404. Home MANET 402 contains mobile phones 406, 408, and 410, PDA 412, tablet 414, and laptop 416 as representative home-MANET devices. Destination MANET 404 contains mobile phones 418 and 420, PDA 422, tablet 424, desktop computer 426, and laptops 428 and 430 as representative destination-MANET devices. A user of laptop 416 may choose one, multiple, or all destination-MANET devices as recipients of data, such as a message. Laptop 416, acting as a promoter device, may then broadcast a query to all home-MANET devices requesting the travel history of each device. The user of laptop 416 may have established an expiration time of 2 days from the query. Laptop 416 may calculate, using the travel history of each home-MANET device, the probabilities of each home-MANET device travelling to destination MANET 404 before that expiration time.

Laptop 416 may conclude that mobile phone 408 and PDA 412 are the only two home-MANET devices with a probability above an established probability threshold, and choose them as courier devices. Laptop 416 may then transmit a data message to mobile phone 408 through a wireless connection (e.g., near-field communication) between the two home-MANET devices. PDA 412, however, may be separated from laptop 416 by a geographic distance that prohibits direct wireless communication between the two home-MANET devices. Laptop 416 may thus transmit the data message to PDA 412 through the MANET (e.g., through a wireless local area network (WLAN) connection between laptop 416 and mobile phone 408, mobile phone 408 and tablet 414, and tablet 414 and PDA 412.

Mobile phone 408 travels to destination MANET 404, as is shown by the arrow in the figure. Once in destination MANET 404, mobile phone 408 may distribute the data message to laptops 428 and 430, which may be the only destination-MANET devices within communication range of mobile phone 408. Once in the MANET, the data message may be spread by the destination-MANET devices in accordance with the address information attached to the data message (i.e., to which destination-MANET devices the data message is to be delivered). For example, the user of laptop 416 may have chosen all destination-MANET devices as recipient devices, in which case the message may spread to all destination-MANET devices. Upon receiving the data message, those devices may analyze it or deliver it to their users. As an alternative example, the user of laptop 416 may have named desktop computer 426 as the sole recipient. In that case, the data message may propagate through destination MANET 404 until it reaches desktop computer 426. In some embodiments the devices of destination MANET 404 may have agreements set on how incoming data messages are to be received and passed through the MANET. For example, each destination-MANET device may be configured to accept and pass on a data message a first time regardless of the devices to which they are directly connected. However, on subsequent instances of receiving the data message, a destination-MANET may only accept and transmit the data message if it is connected to a different set of devices than it was on the prior instances of receiving the data message. Further, each destination-MANET device to whom the message is not addressed may delete the message after passing it on throughout the MANET.

In some embodiments a MANET may be partially composed of devices that rarely, if ever, move throughout or leave the network. For example, in some embodiments destination MANET 404 may be composed of several hundred desktop computers in addition to the destination-MANET devices illustrated in FIG. 4. In some embodiments it may be beneficial for these permanent or semi-permanent devices to serve as coordinating devices, as they would always or almost always be available in the network to respond to queries related to travel-probability.

In some embodiments, the data message may be encrypted such that only the intended recipients may read the content of the data message (e.g., the portion of the data message that is not the address information). In these instances the intended recipient may have received a cryptographic key prior to mobile phone 408 carrying the message to destination MANET 404, allowing the intended recipients to translate the data message upon receipt.

Figure 5:
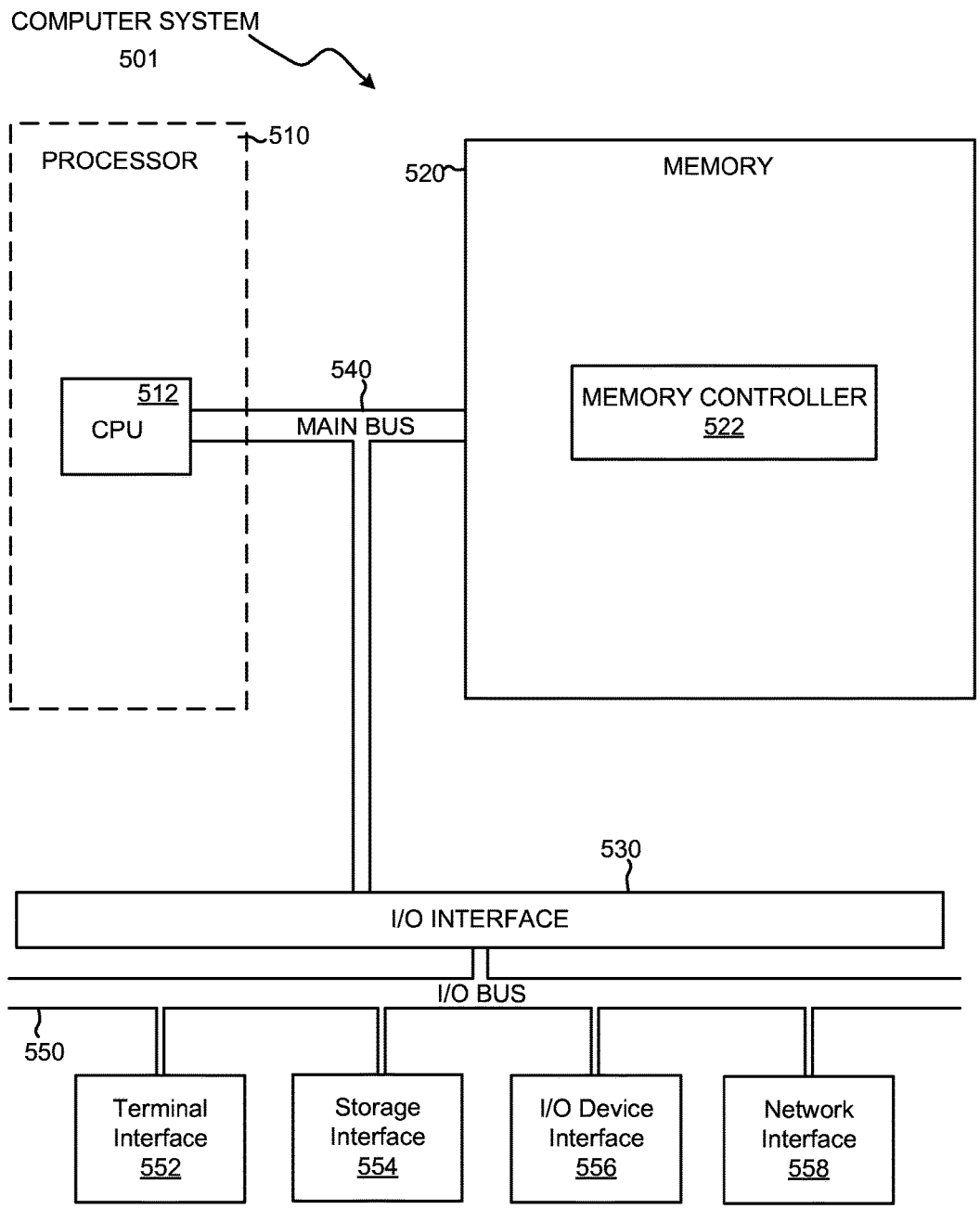
FIG. 5 depicts the representative major components of a computer system that may be used in accordance with embodiments of the present disclosure While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

FIG. 5 depicts the representative major components of an exemplary Computer System 501 that may be used in accordance with embodiments of the present disclosure. In some embodiments, for example, the Computer System 501 may be a promoter device. The particular components depicted are presented for the purpose of example only and are not necessarily the only such variations. The Computer System 501 may comprise a Processor 510, Memory 520, an Input/Output Interface (also referred to herein as I/O or I/O Interface) 530, and a Main Bus 540. The Main Bus 540 may provide communication pathways for the other components of the Computer System 501. In some embodiments, the Main Bus 540 may connect to other components such as a specialized digital signal processor (not depicted).

The Processor 510 of the Computer System 501 may be comprised of one or more CPUs 512. The Processor 510 may additionally be comprised of one or more memory buffers or caches (not depicted) that provide temporary storage of instructions and data for the CPU 512. The CPU 512 may perform instructions on input provided from the caches or from the Memory 520 and output the result to caches or the Memory 520. The CPU 512 may be comprised of one or more circuits configured to perform one or methods consistent with embodiments of the present disclosure. In some embodiments, the Computer System 501 may contain multiple Processors 510 typical of a relatively large system. In other embodiments, however, the Computer System 501 may be a single processor with a singular CPU 512.

The Memory 520 of the Computer System 501 may be comprised of a Memory Controller 522 and one or more memory modules for temporarily or permanently storing data (not depicted). In some embodiments, the Memory 520 may comprise a random-access semiconductor memory, storage device, or storage medium (either volatile or non-volatile) for storing data and programs. The Memory Controller 522 may communicate with the Processor 510, facilitating storage and retrieval of information in the memory modules. The Memory Controller 522 may communicate with the I/O Interface 530, facilitating storage and retrieval of input or output in the memory modules. In some embodiments, the memory modules may be dual in-line memory modules.

The I/O Interface 530 may comprise an I/O Bus 550, a Terminal Interface 552, a Storage Interface 554, an I/O Device Interface 556, and a Network Interface 558. In some embodiments, the Computer System 501 may connect with the devices in a MANET through Network Interface 558. The I/O Interface 530 may connect the Main Bus 540 to the I/O Bus 550. The I/O Interface 530 may direct instructions and data from the Processor 510 and Memory 520 to the various interfaces of the I/O Bus 550. The I/O Interface 530 may also direct instructions and data from the various interfaces of the I/O Bus 550 to the Processor 510 and Memory 520. The various interfaces may comprise the Terminal Interface 552, the Storage Interface 554, the I/O Device Interface 556, and the Network Interface 558. In some embodiments, the various interfaces may comprise a subset of the aforementioned interfaces (e.g., an embedded computer system in an industrial application may not include the Terminal Interface 552 and the Storage Interface 554).

Logic modules throughout the Computer System 501—including but not limited to the Memory 520, the Processor 510, and the I/O Interface 530—may communicate failures and changes to one or more components to a hypervisor or operating system (not depicted). The hypervisor or the operating system may allocate the various resources available in the Computer System 501 and track the location of data in Memory 520 and of processes assigned to various CPUs 512. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    identifying, by a processor, content to be communicated to a first network;
    identifying, by the processor, information associated with a probability that a first device of a second network will travel to the first network; and
    transferring, by the processor and based on the information associated with the probability, the content to the first device, wherein the content comprises a request for a reply communication.

2. The method of claim 1, wherein identifying the information associated with a probability that a first device of a second network will travel to the first network comprises:
    sending, by the processor, a first query to the first device of a second network requesting the information; and
    receiving, by the processor and from the first device, the information.

3. The method of claim 2, further comprising sending to the first device, by the processor and before sending the first query, a second query requesting whether the first device has previously visited the first network.

4. The method of claim 1, wherein the information comprises a statement of the probability.

5. The method of claim 1, further comprising:
    establishing, by the processor, an expiration time before which the content is to be received by the first network; and
    transferring, by the processor and with the content, the expiration time to the first device.

6. The method of claim 1, wherein the first device's probability of visiting the first network is a probability of visiting the first network before an expiration time.

7. The method of claim 1, wherein the content is directed to all devices of the first network.

8. The method of claim 7, wherein the content is an advertisement.

9. The method of claim 1, wherein the content is directed to a second device of the first network.

10. The method of claim 5, further comprising:
    transferring, by the processor and with the content, a request for the content to be deleted by the first device if the first device does not visit the first network prior to the expiration time.

11. A system comprising a processor, wherein the processor is configured to perform a method for inter-network communications comprising:
  identify, by a processor, content to be communicated to a first network;
  identify, by the processor, information associated with a first probability that a first device of a second network will travel to the first network;
  identify, by the processor, information associated with a second probability that the first device will return from the first network; and
  transfer, by the processor and based on the first probability and second probability, the content to the first device.

* * * * *